(12) United States Patent
Brantner

(10) Patent No.: US 12,295,351 B2
(45) Date of Patent: May 13, 2025

(54) HIGH PRODUCTION HONEY BEEHIVE MANAGEMENT SYSTEM

(71) Applicant: Daniel C. Brantner, Plano, TX (US)

(72) Inventor: Daniel C. Brantner, Plano, TX (US)

(*) Notice: Subject to any disclaimer, the term of this patent is extended or adjusted under 35 U.S.C. 154(b) by 0 days.

(21) Appl. No.: 18/243,749

(22) Filed: Sep. 8, 2023

(65) Prior Publication Data
US 2023/0413788 A1    Dec. 28, 2023

Related U.S. Application Data

(63) Continuation-in-part of application No. 17/866,554, filed on Jul. 18, 2022.

(60) Provisional application No. 63/243,684, filed on Sep. 13, 2021.

(51) Int. Cl.
*A01K 47/06* (2006.01)
*A01K 49/00* (2006.01)

(52) U.S. Cl.
CPC .............. *A01K 47/06* (2013.01); *A01K 49/00* (2013.01)

(58) Field of Classification Search
CPC ......... A01K 47/02; A01K 47/06; A01K 47/00
See application file for complete search history.

(56) References Cited

U.S. PATENT DOCUMENTS

| | | | | |
|---|---|---|---|---|
| 9,300 A | * | 10/1852 | Langstroth | A01K 47/06 449/16 |
| 84,415 A | * | 11/1868 | Cuplin | A01K 47/00 449/40 |
| 91,203 A | * | 6/1869 | Berix | A01K 47/06 449/22 |
| 95,100 A | * | 9/1869 | Flick | A01K 47/06 449/22 |
| 95,436 A | * | 10/1869 | Critchfield | A01K 47/00 449/41 |
| 330,783 A | * | 11/1885 | Groff | A01K 47/00 449/38 |
| 387,217 A | * | 8/1888 | Doyal | A01K 47/02 449/35 |

(Continued)

FOREIGN PATENT DOCUMENTS

| | | | | |
|---|---|---|---|---|
| CA | 1131506 A | * | 9/1982 | ............. A01K 47/06 |
| CN | 1568142 A | * | 1/2005 | ............. A01K 47/06 |

(Continued)

OTHER PUBLICATIONS

Merged translation of CN_106614103 (Year: 2017).*

(Continued)

*Primary Examiner* — Morgan T Jordan
(74) *Attorney, Agent, or Firm* — Thrasher Associates, LLC

(57) ABSTRACT

Embodiments herein disclose a beehive system for high honey production. The beehive system includes a common brood box arranged between a first brood box and a second brood box. A first lid slot assembly is arranged between the common brood box and the first brood box. A second lid slot assembly is arranged between the common brood box and the second brood box. The common brood box, the first brood box and the second brood box are arranged parallel to each other. A bottom side of the first brood box, a bottom side of the second brood box and a bottom side of the common brood box are located in a same plane.

20 Claims, 10 Drawing Sheets

(56) References Cited

U.S. PATENT DOCUMENTS

| | | | | |
|---|---|---|---|---|
| 468,783 A * | 2/1892 | Brewer | A01K 47/00 | 449/32 |
| 499,490 A * | 6/1893 | Wismer | A01K 47/06 | 449/25 |
| 509,438 A * | 11/1893 | Langdon | A01K 47/00 | 449/25 |
| 808,144 A * | 12/1905 | Dempsey | A01K 47/06 | 449/24 |
| 993,060 A * | 5/1911 | Hand | A01K 47/06 | 449/25 |
| 1,203,675 A * | 11/1916 | Wood | A01K 47/00 | 449/37 |
| 1,211,145 A * | 1/1917 | Hains | A01K 47/06 | 449/24 |
| 2,103,066 A * | 12/1937 | Engelbrektsson | A01K 47/00 | 449/45 |
| 2,543,750 A * | 3/1951 | Albrecht | A01K 47/00 | 449/7 |
| 3,995,338 A * | 12/1976 | Kauffeld | A01K 47/06 | 449/19 |
| 4,135,265 A * | 1/1979 | Van de Kerkof | A01K 47/00 | 449/9 |
| 4,158,900 A * | 6/1979 | Musgrove | A01K 47/06 | 449/23 |
| 4,257,133 A * | 3/1981 | Steinrucken | A01K 47/06 | 449/12 |
| 4,367,563 A * | 1/1983 | Ferguson | A01K 47/06 | 449/19 |
| 4,402,099 A * | 9/1983 | Platt, Jr. | A01K 47/00 | 449/2 |
| 4,455,699 A * | 6/1984 | Brown | A01K 47/06 | 449/21 |
| 4,459,715 A * | 7/1984 | Adams, IV | A01K 47/00 | 449/32 |
| 4,483,031 A * | 11/1984 | Shaparew | A01K 47/06 | 449/14 |
| 10,729,109 B1 * | 8/2020 | Wolfe, II | A01K 49/00 | |
| 2014/0127969 A1 * | 5/2014 | Mullins | A01K 49/00 | 449/7 |
| 2014/0134921 A1 * | 5/2014 | Dron | A01K 47/00 | 449/32 |
| 2016/0212976 A1 * | 7/2016 | Bulanyy | A01K 47/06 | |
| 2018/0295815 A1 * | 10/2018 | Schulte | A01K 47/06 | |

FOREIGN PATENT DOCUMENTS

| | | | | |
|---|---|---|---|---|
| CN | 106614103 A | * | 5/2017 | |
| CN | 111466318 B | * | 7/2022 | A01K 47/02 |
| DE | 202016006529 U1 | * | 12/2016 | |
| DE | 102016012619 A1 | * | 4/2018 | A01K 47/00 |
| FR | 2595909 A1 | * | 9/1987 | |
| GB | 543588 A | * | 3/1942 | |
| GB | 2586263 A | * | 2/2021 | A01K 47/06 |
| KR | 200351851 Y1 | * | 5/2004 | |
| KR | 20090009494 U | * | 9/2009 | |
| KR | 20110024884 A | * | 3/2011 | |
| WO | WO-2010098853 A1 | * | 9/2010 | A01K 47/06 |

OTHER PUBLICATIONS

Merged translation of CN_111466318_B (Year: 2022).*
Merged translation of DE_102016012619 (Year: 2018).*
Merged translation of DE_202016006529 (Year: 2016).*
Merged translation of FR_2595909 (Year: 1987).*
Merged translation of GB_2586263 (Year: 2021).*
Merged translation of KR_200351851 (Year: 2004).*
Merged translation of KR_20090009494 (Year: 2009).*
Merged translation of KR_20110024884 (Year: 2011).*
Merged translation of WO_2010098853 (Year: 2010).*

* cited by examiner

HIGH PRODUCTION HONEY BEEHIVE MANAGEMENT SYSTEM

CLAIM OF PRIORITY, IDENTIFICATION OF RELATED APPLICATIONS

This patent application is a Continuation in Part of Pending U.S. patent application Ser. No. 17/866,554 filed on Jul. 18, 2022 and entitled HIGH PRODUCTION HONEY BEEHIVE MANAGEMENT SYSTEM, which claims priority from U.S. Provisional Patent Application No. 63/243,684 filed on Sep. 13, 2021 entitled HIGH PRODUCTION HONEY BEE HIVE, both to common inventor Daniel Brantner.

TECHNICAL FIELD

The invention generally relates to honey production, and more specifically to high production honey beehive management systems for hobbyists.

Problem Statement and History Interpretation Considerations

This section describes technical field in detail and discusses problems encountered in the technical field. Therefore, statements in the section are not to be construed as prior art.

Discussion of History of the Problem

Mankind began harnessing bees for honey production long before recorded history. The most ancient breweries—which produced a product called honey beer—often incorporated honey production within the brewery. Indeed, when explorers first encountered tribes such as the Maasai of Africa in the 1800s, these tribes which claim 10,000 years of oral history were discovered to practice this method of beer production.

In the West, honey production and bee keeping (or 'bee husbandry") evolved into a science in the 1800s, and has long been recognizable for the boxed-hive system that has been 'state of the art' for around 100 years. Commonly, hives comprise boxes specialized for worker and queen residence, and others used for honey production.

For decades, honey producers have speculated about hive designs that could lead to more robust honey production, to wit:

A prior art reference "US20140127969A1" discloses a man-made beehive that allows a plurality of bees to store more of a plurality of honey, wherein the man-made beehive includes a natural cedar wood general rectangular shape two queen hive, a plurality of brood boxes removably held within the two-queen hive, the brood boxes house a plurality of eggs, larvae and pupae from the bees utilized by the man-made beehive and a plurality of screened bottom boards positioned in the bottom portion of the two queen hive. The man-made beehive also includes a telescoping cover positioned on the top portion of the two-queen hive to protect the man-made beehive and a queen excluder that is positioned between a pair of the brood boxes.

Another prior art reference "U.S. Pat. No. 4,241,467A" discloses a method and a system for introducing a second queen into an established colony of honey bees for additional build-up of the worker bee force prior to the early honey flow, and for the eventual replacement of the resident queen. The established brood is divided into two divisions and placed in separate brood chambers positioned side by side with the resident queen in one division and an introduced queen in the other division. A hive chamber containing drawn comb or comb foundation is placed over each of the chambers containing brood to provide space for brood expansion. Worker bees can move vertically and diagonally among the hive chambers. The two queen bees can move either vertically or diagonally between two hive chambers in a manner which prevents direct contact between them during the brood build-up.

Yet another prior art reference "U.S. Ser. No. 10/729,109B1" discloses a two-queen beehive including a base having a first compartment for retaining a first queen, a second compartment for retaining a second queen, and a divider dividing the first compartment from the second compartment. A first roof extends over a portion of the first compartment, such that a remaining portion of the first compartment proximate to the divider is open. A second roof extends over a portion of the second compartment, such that a remaining portion of the second compartment proximate to the divider is open. A distance encompassing the remaining portion of the first compartment, the divider, and the remaining portion of the second compartment is sized to receive and retain a super mounted thereon.

However, none of these prior art references have proposed designs that are deployable in actual honey production. Either their designs are limited in their environmental resiliency, in their economic feasibility, and/or their in-use production. Accordingly, there exists the need for systems and devices that achieve high honey production, are sufficiently environmentally resilient to last through a production season, are economically viable and provide a simplified method to manage the various stages of the honey beehive over its annual cycle. The present invention provides such beehive systems and honey beehive management system.

SUMMARY

The above objective is solved by a high production honey beehive system comprising the features of independent claims. Advantageous embodiments and applications of the present invention are defined in the dependent claims.

The beehive system includes a horizontal brood box that can be divided as needed throughout the course of the year to allow two queen bees to share a common bee hive population. A top portion of the first brood box is covered by a first telescoping cover with inner cover, where the first telescoping cover with inner cover is easily removable/attachable from/to the first brood box and a top portion of the second brood box is covered by a second telescoping cover with inner cover, wherein the second telescoping cover with inner cover is easily removable/attachable from/to the second brood box. Similarly, a top portion of a common portion of the brood box is covered by a third telescoping cover with inner cover, where the third telescoping cover with inner cover is easily removable/attachable from/to the common portion of the brood box. Further, a first lid slot assembly is arranged between first brood box and the common portion of the brood box and a second lid slot assembly is arranged between the common portion of the brood box and the second brood box.

The beehive system also includes a first entrance reducer, and a second entrance reducer placed at an entrance to the first brood box and the second brood box, respectively, so as to reduce a size of an opening of the first brood box and the second brood box, respectively, and a bee entrance in the common portion of the brood box.

In an embodiment of the present invention, the beehive system further includes a first solid hive box divider separating the first brood box from the common portion of the brood box and a second solid hive box divider separating the second brood box from the common portion of the brood box. In another embodiment of the present invention, the beehive system further includes a first vertical queen excluder separating the first brood box from the second box.

In an implementation, the beehive system includes a first honey super box positioned over the second horizontal queen excluder which is immediately above the common brood box. The first honey super box is in vertical alignment with the common brood box. A second honey super box is positioned over and in vertical alignment with the first honey super box. Additional honey super boxes may be positioned over and in vertical alignment with the second honey super box as required. The third telescoping cover with inner cover is placed on top of the top honey super box.

Of course, the present is simply a Summary, and not a complete description of the invention.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT INTERPRETATION CONSIDERATIONS

Figure 1:
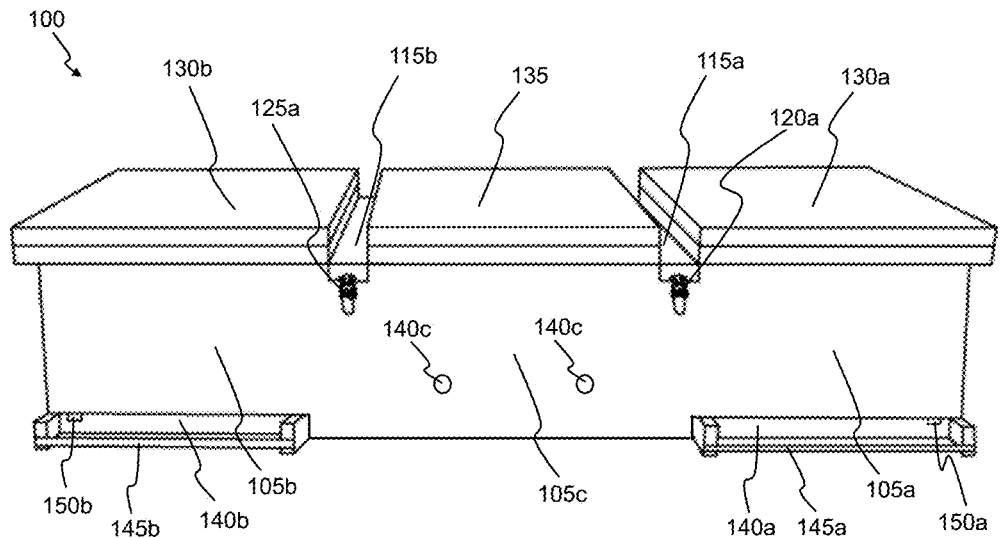
FIG. 1 illustrates a front perspective view of a beehive system.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

The present invention discloses honey production systems and devices comprising sub-systems and elements shown and described below. Advantageously, the present invention assists in achieving high honey production using the honey production systems and devices which are sufficiently environmentally resilient to last through a production season and are economically viable and simplified hive management.

TABLE

LIST OF REFERENCE NUMERALS

| Reference Numeral | Element Name |
| --- | --- |
| 100 | Beehive system |
| 105a | First brood box |
| 105b | Second brood box |
| 105c | Common brood box with integral bottom board |
| 105d | Third brood box |
| 110a | First honey super box |
| 110b | Second honey super box |
| 115a | First lid slot assembly |
| 115b | Second lid slot assembly |
| 120 | First lid latch assembly |
| 125 | Second lid latch assembly |
| 120a and 125a | First connecting means |

TABLE-continued

LIST OF REFERENCE NUMERALS

| Reference Numeral | Element Name |
|---|---|
| 120b and 125b | Second connecting means |
| 130a | First telescoping cover with inner cover |
| 130b | Second telescoping cover with inner cover |
| 135 | Third telescoping cover with inner cover |
| 140a | First entrance reducer |
| 140b | Second entrance reducer |
| 140c | Bee Entrance |
| 145a | First bottom board |
| 145b | Second bottom board |
| 150a | First opening in entrance reducer |
| 150b | Second opening in entrance reducer |
| 155a | First queen excluder (vertical queen excluder) |
| 155b | Second queen excluder (horizontal queen excluder) |
| 160a | First lid hinge |
| 160b | Second lid hinge |
| 165a-165d | Plurality of first type of beehive frames |
| 170a and 170b | Plurality of second type of beehive frames |
| 175a-175b | Plurality of recesses |
| 180a | First set of frame rest |
| 180b | Second set of frame rest |
| 190a | First solid hive box divider |
| 190b | Second solid hive box divider |
| 195 | Bee space gap of approximately 3/8" |
| 197 | Gasket |
| 199a | First panel receiving slot (or slot pair) |
| 199b | Second panel receiving slot (or slot pair) |
| 199c | First queen excluder receiving slot (or slot pair) |

Figure 2:
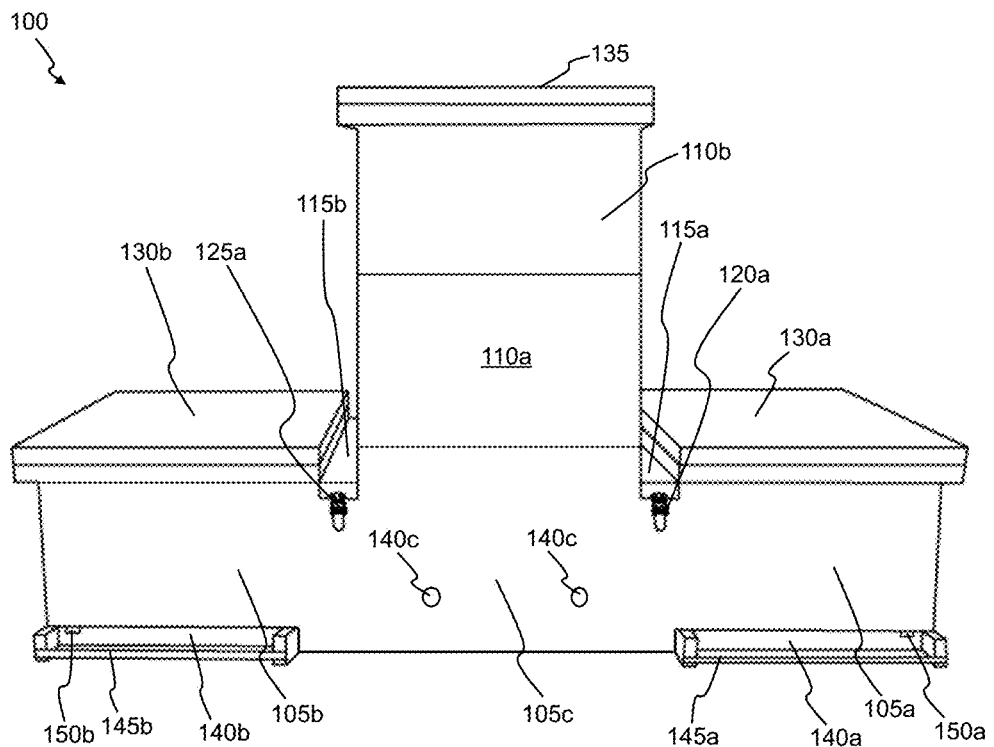
FIG. 2 illustrates a front perspective view of the beehive system depicting an alternative arrangement.
Figure 3:
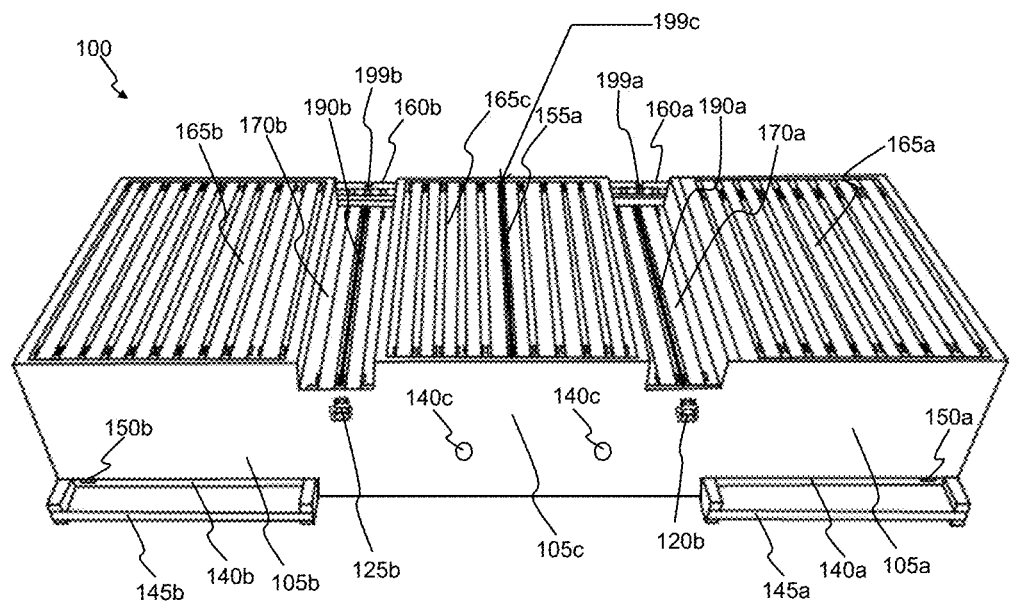
FIG. 3 is a top perspective view of the beehive system with a plurality of first type of beehive frames and a plurality of second type of beehive frames.
Figure 4:
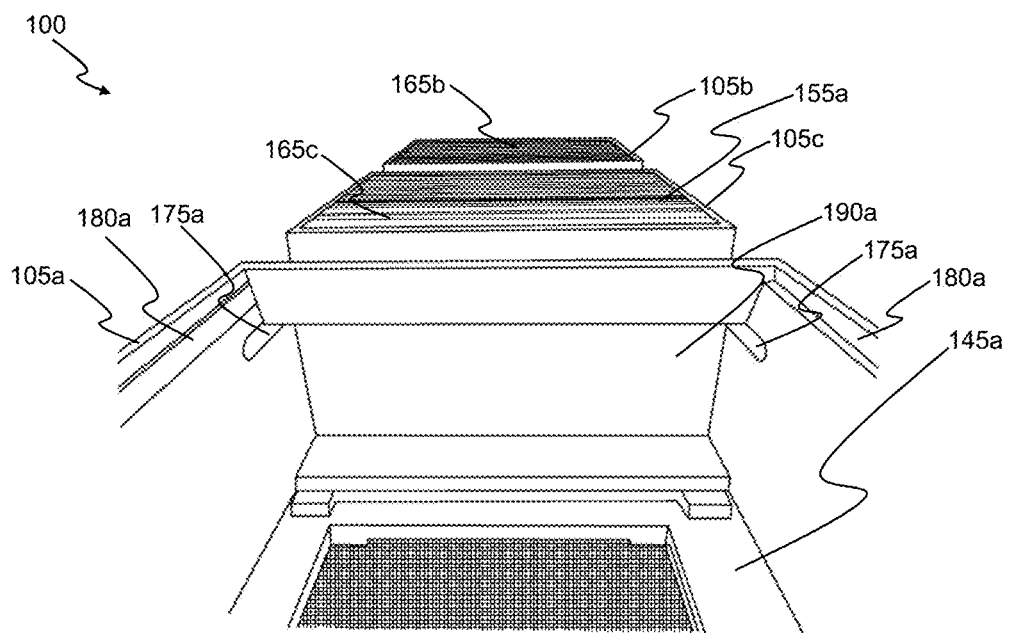
FIG. 4 illustrates a side perspective view depicting inner portions of the beehive system.
Figure 5:
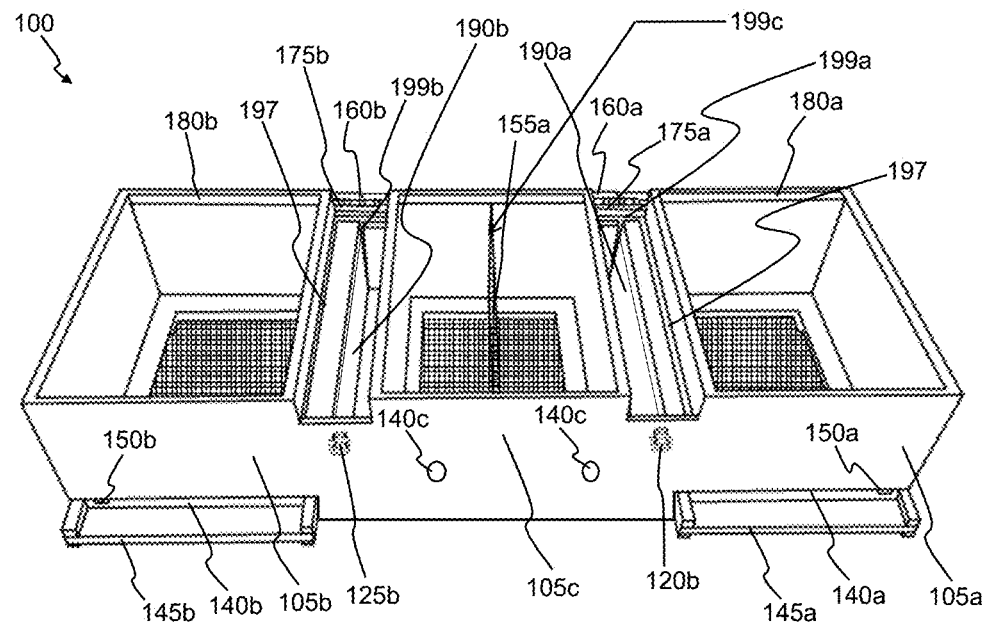
FIG. 5 illustrates a top perspective view of the inner portions of the beehive system.
Figure 6:
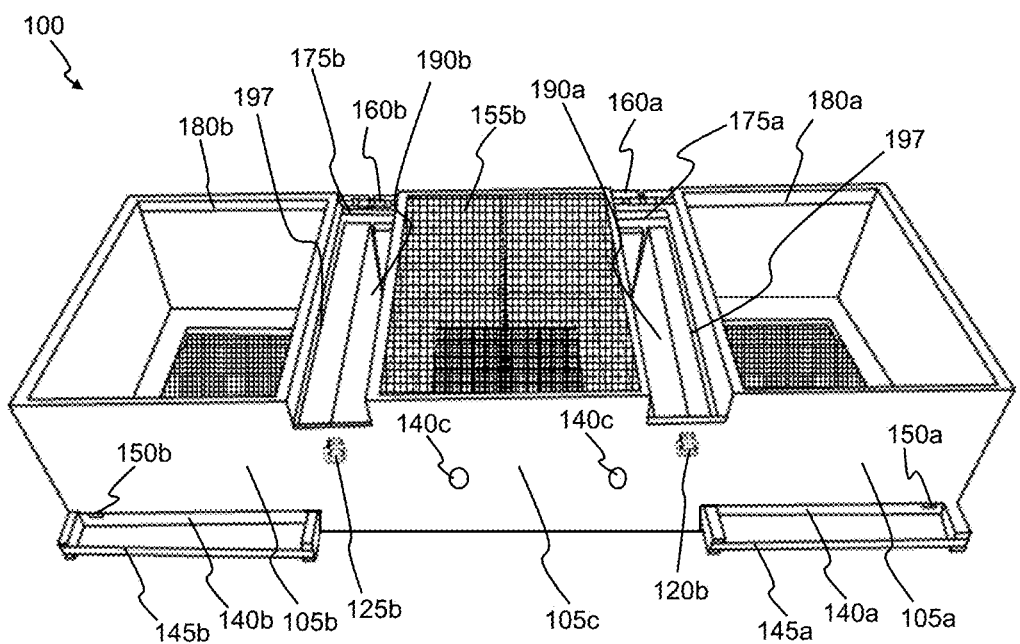
FIG. 6 illustrates a top perspective view of the inner portions of the beehive system showing additional details.
Figure 7:
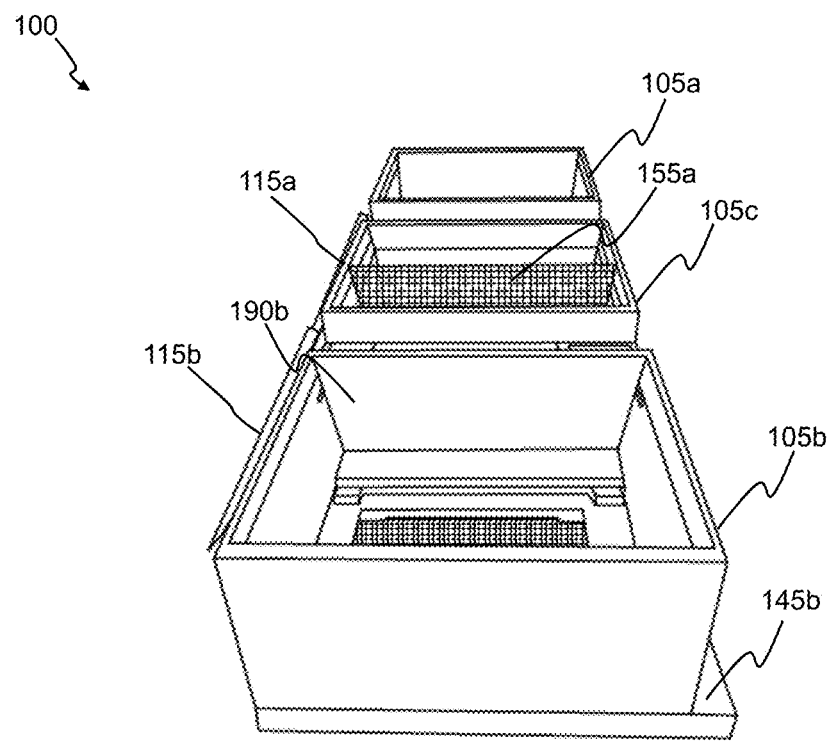
FIG. 7 illustrates a side perspective view of the inner portions of the beehive system.
Figure 8:
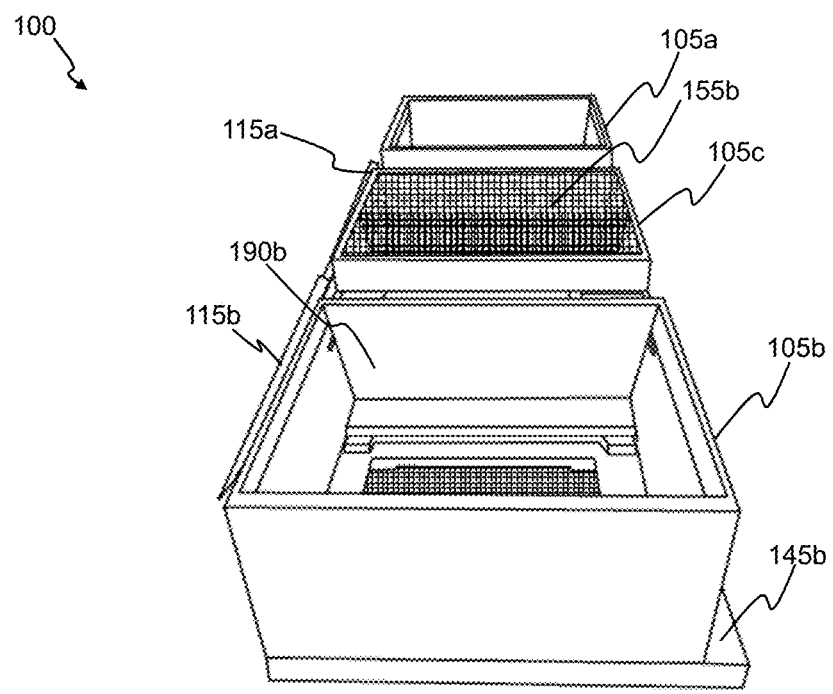
FIG. 8 illustrates a side perspective view of the inner portions of the beehive system showing additional details.
Figure 9:
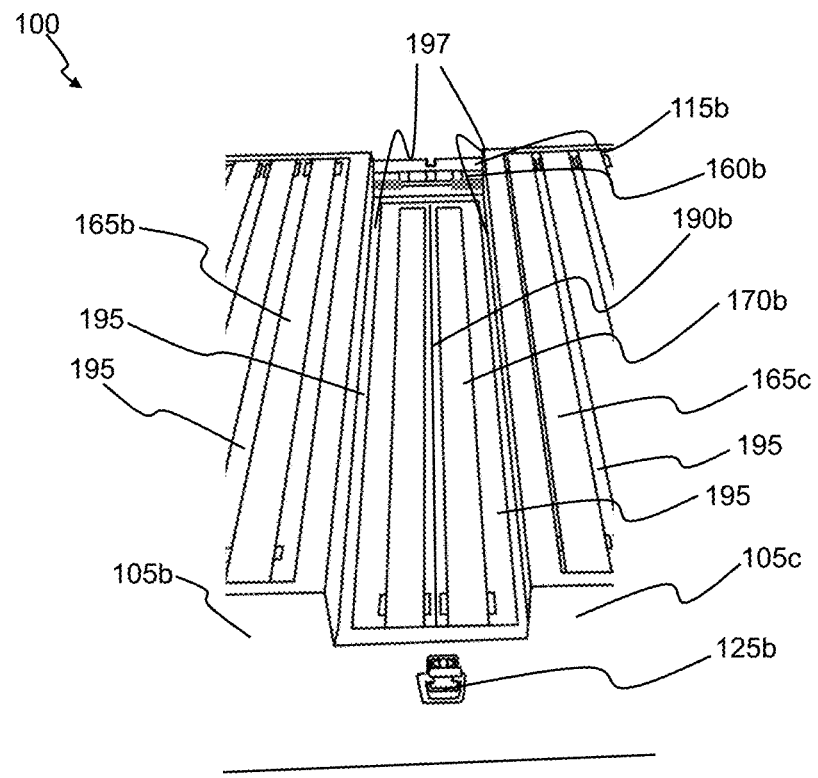
FIG. 9 illustrates a closer perspective view of inner portions of the beehive system.
Figure 10:
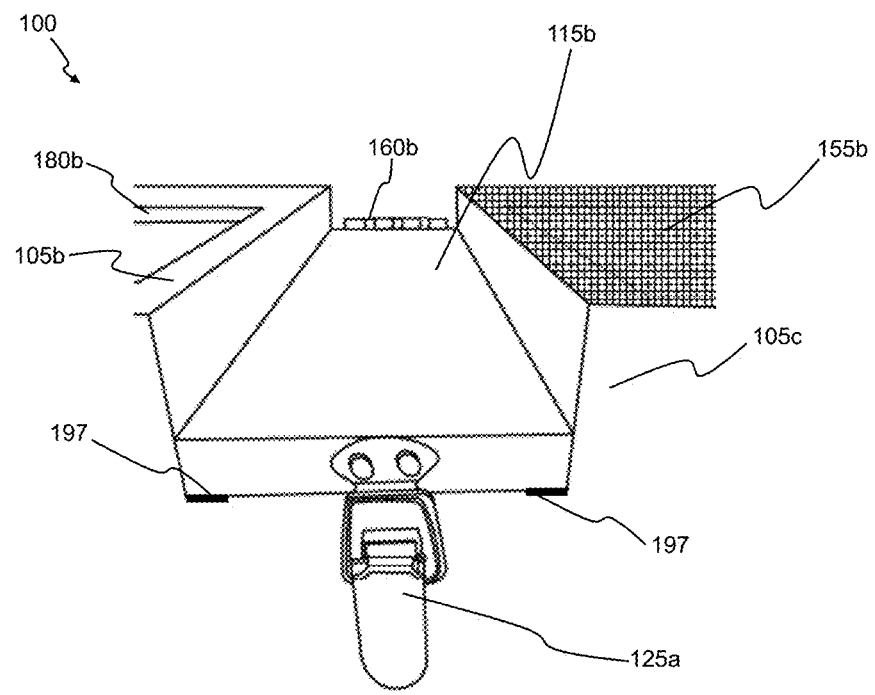
FIG. 10 illustrates a closer perspective view of inner portions of the beehive system showing additional details.

In opening, simultaneous reference is made to FIGS. 1 through 15, in which FIG. 1 illustrates a front perspective view of a beehive system 100 with a first arrangement, FIG. 2 illustrates a front perspective view of the beehive system 100 depicting a second arrangement, FIG. 3 illustrates a top perspective view of the beehive system 100 with a plurality of first type of beehive frames and a plurality of second type of beehive frames, FIG. 4 illustrates a side perspective view depicting inner portions of the beehive system 100, FIG. 5 and FIG. 6 illustrate a top perspective view of the inner portions of the beehive system 100, FIG. 7 and FIG. 8 illustrate a side perspective view of the inner portions of the beehive system 100, FIG. 9 and FIG. 10 illustrate a closer perspective view of inner portions of the beehive system 100. FIG. 11, FIG. 12, FIG. 13, FIG. 14, and FIG. 15 illustrate various schematic configurations of a high production honey beehive system throughout the course of a year.

The beehive system 100 and its components as disclosed below are made of at least one of wood, steel, polymer, plastic, aluminum, or combination thereof. The beehive system 100 comprises a first brood box 105a, a second brood box 105b, a common brood box 105c, a first lid slot assembly 115a, a second lid slot assembly 115b, a first lid latch assembly 120, a second lid latch assembly 125, a first connecting means 120a, 125a, a second connecting means 120b, 125b, a first telescoping cover with an inner cover 130a, a second telescoping cover with an inner cover 130b, a third telescoping cover with an inner cover 135, a first entrance reducer 140a, a second entrance reducer 140b, a bee entrance 140c, a first bottom board 145a, a second bottom board 145b, a first opening 150a in the entrance reducer, a second opening 150b in the entrance reducer, a first queen excluder 155a (i.e., vertical queen excluder), a second queen excluder 155b (i.e., horizontal queen excluder), a first lid hinge 160a, a second lid hinge 160b, a plurality of first type of beehive frames 165a-165c, a plurality of second type of beehive frames 170a, 170b, a plurality of recesses 175a, 175b, a first set of frame rest 180a, a second set of frame rest 180b, a first solid hive box divider 190a, a second solid hive box divider 190b, a trim seal (aka "gasket") 197, a first panel receiving slot 199a, a second panel receiving slot 199b and a first queen excluder receiving slot 199c (which may be implemented as a slot-pair by repeating a slot on the interior of the common brood box 105c opposite of that shown). Note that although the "common brood box 105c" is called "common" as its proper name herein, the word "common" does not mean that the brood box is prior art (and it is not prior art), nor does the word common imply herein that it is a known or ordinary brood box in any sense other than in the sense it is manufactured in a manner that is common for other brood box designs, and that that one of ordinary skill in the beehive manufacturing arts will understand how to make and use the invention upon reading this disclosure.

Referring to FIG. 1, the first brood box 105a, the second brood box 105b and the common brood box 105c are arranged linearly, with what are functionally their fronts parallel to each other. The front-facing and back-facing portions of the brood boxes 105a, 105b and the common brood box 105c are preferably integrated as a single wall panel of boards, typically made of wood. The common brood box 105c is arranged between the first brood box 105a and the second brood box 105b. A distance between the first honey super box 110a and the first brood box 105a is preferably based on industry standards or alternatively based on user requirements. Similarly, a distance between the first honey super box 110a and the second brood box 105b is preferably based on industry standards or alternatively based on user requirements. A bottom side of the first brood box 105a, a bottom side of the second brood box 105b and a bottom side of the common brood box 105c are located generally in a same plane. The first brood box 105a, the second brood box 105b and the common brood box 105c house a plurality of eggs, larvae and pupae from bees, as well as other materials well known to those of ordinary skill in the beekeeping arts.

Further, the first brood box 105a is substantially similar to the second brood box 105b and the common brood box 105c, although that is not a necessity for the invention. The height and width of the first brood box 105a, the second brood box 105b and the common brood box 105c are substantially same. The shape of the first brood box 105a, the second brood box 105b and the common brood box 105c may be rectangular or square, for example.

For embodiments of the invention, where the first brood box 105a, the second brood box 105b and the common brood box 105c are identical, the below description of the first brood box 105a may be applicable to the second brood box 105b and the common brood box 105c.

Each of the first brood box 105a, the second brood box 105b and the common brood box 105c is defined by a top portion, four sides and a bottom. The bottom (not shown) may have a plurality of ventilation openings. The top portion of the first brood box 105a is covered by the first telescoping cover with the inner cover 130a, where the first telescoping cover with inner cover 130a is easily removable/attachable from/to the first brood box 105a and the top portion of the second brood box 105b is covered by the second telescoping cover with inner cover 130b, wherein the second telescoping cover with inner cover 130b is easily removable/attachable from/to the second brood box 105b. Similarly, the top portion of the common brood box 105c is covered by the third telescoping cover with inner cover 135, where the third telescoping cover with inner cover 135 is easily removable/attachable from/to the common brood box 105c.

The first lid slot assembly 115a is arranged between the common brood box 105c and the first brood box 105a and the second lid slot assembly 115b is arranged between the common brood box 105c and the second brood box 105b. The first lid slot assembly 115a and the second lid slot assembly 115b are arranged above a ground plane and comprise the first lid latch assembly 120 and the second lid latch assembly 125 respectively. Each of the first lid latch assembly 120 and the second lid latch assembly 125 comprises the first connecting means 120a, 125a and the second connecting means 120b, 125b for latching the first lid slot assembly 115a and the second lid slot assembly 115b respectively. The first connecting means 120a, 125a and the second connecting means 120b, 125b may be a snap-fit assembly, a latch assembly, interlock-based assembly, for example.

The first entrance reducer 140a is placed at an entrance to the first brood box 105a so as to reduce a size of an opening of the first brood box 105a. The first entrance reducer 140a is placed between the first bottom board 145a and the first brood box 105a. The first bottom board 145a is placed under the first brood box 105a, where a length of the first bottom board 145a is greater than a length of the first brood box 105a. A distance between the first bottom board 145a and the first brood box 105a is based on industry standards or based on user requirements. The first entrance reducer 140a includes the first opening 150a in the entrance reducer to provide a passage way for bees into the first brood box 105a. The first bottom board 145a provides a landing space for bees to assemble in front of the first brood box 105a before entering into the first brood box 105a. The first bottom board 145a may be a screened bottom board, a solid bottom board, for example.

Similarly, the second entrance reducer 140b is placed at an entrance to the second brood box 105b. The second entrance reducer 140b is placed between the second bottom board 145b and the second brood box 105b and the second bottom board 145b is placed under the second brood box 105b. A distance between the second bottom board 145b and the second brood box 105b is based on industry standards or based on user requirements. A length of the second bottom board 145b is greater than a length of the second brood box 105b. The second entrance reducer 140b includes the second opening 150b in the entrance reducer to provide a passage way for bees into the second brood box 105b. The second bottom board 145b provides a landing space for the bees to assemble in front of the second brood box 105b before entering into the first brood box 105a. The second bottom board 145b may be a screened bottom board, a solid bottom board, for example.

The common brood hive 105c has an integral bottom board that extends from the edge of the first bottom board 145a to the edge of the second bottom board 145b. This integral bottom board may be a screened bottom board or a solid bottom board.

In an alternate arrangement, as shown in FIG. 2, the beehive system 100 includes a first honey super box 110a positioned over and in vertical alignment with the common brood box 105c and a second honey super box 110b positioned over and in vertical alignment with the first honey super box 110a. The first telescoping cover with inner cover 130a covers a top portion of the first brood box 105a, the second telescoping cover with inner cover 130b covers a top portion of the second brood box 105b, and the third telescoping cover 135 covers a top portion of the second honey super box 110b. Addition of the common brood box 105c, the first honey super box 110a, and the second honey super box 110b results into increased honey production. It may be noted that the number of brood boxes and honey super boxes are used based on user requirements, thus is not limited to the arrangements shown in Figures.

The beehive system 100 further includes the first queen excluder 155a (i.e., vertical queen excluder) as shown in FIG. 3, FIG. 4, FIG. 5 and FIG. 7, the second queen excluder 155b (i.e., horizontal queen excluder) as shown in FIG. 6, FIG. 8 and FIG. 10, the first lid hinge 160a and the second lid hinge 160b as shown in FIG. 3, FIG. 5 and FIG. 6 and the first solid hive box divider 190a and the second solid hive box divider 190b as shown in FIG. 3 and FIG. 4.

The first queen excluder 155a (i.e., vertical queen excluder) divides the common brood box 105c in two, thus providing additional plurality of first type of beehive frames 165c to be added to both the first brood box 105a and the second brood box 105b. This arrangement allows for an increase in the number of plurality of first type of beehive frames 165c in both the first brood box 105a and the second brood box 105b that are available for brood production while allowing the worker bees to freely circulate between the first brood box 105a and the second brood box 105b. The first queen excluder (i.e., vertical queen excluder) separates the queen in the first hive box 105a from the queen in the second hive 105b. The second queen excluder 155b (i.e., horizontal queen excluder) separates the common brood box 105c from the first honey super box 110a, as shown in FIG. 6 and FIG. 8, and keeps the queen bee in the first brood box 105a and the queen bee in the second brood box 105b separate from the first honey super box 110a. The first queen excluder 155a and the second queen excluder 155b have a mesh like structure or screened surface.

Alternatively, the first solid hive box divider 190a separates the first brood box 105a from the common brood box 105c and the second solid hive box divider 190b separates the second brood box 105b from the common brood box 105c. The first solid hive box divider 190a is used to limit the number of plurality of second type of beehive frames 170a in the first brood box 105a while brood box 105a is in the early developmental stage. The second solid hive box divider 190b is used to limit the number of plurality of second type of beehive frames 170b in the second brood box 105b while brood box 105b is in the early developmental stage. The first solid hive box divider 190a and the second solid hive box divider 190b are removably placed in the beehive system 100 using the first panel receiving slot 199a and the second panel receiving slot 199b respectively as shown in FIG. 3 and FIG. 5. When the plurality of first type of beehive frames 165a in the first brood box 105a are approximately 80% filled, the first solid hive box divider 190a is removed to allow for the bee population in the first brood box 105a to expand into the plurality of second type of beehive frames 170a and half of the plurality of first type of beehive frames located in the common brood box 105c. Likewise, when the plurality of first type of beehive frames 165b in the second brood box 105b are approximately 80% filled, the second solid hive box divider 190b is removed to allow for the bee population in the second brood box 105b to expand into the plurality of second type of beehive frames 170b and half of the plurality of first type of beehive frames located in the common brood box 105c. The queen bee in the first brood box 105a and the queen bee in the second brood box 105b are separated from each other by the first queen excluder 155a located in common brood box 105c.

Alternatively, the first queen excluder 155a is removably placed in the beehive system 100 using the first queen excluder receiving slot 199c as shown in FIG. 7.

The first lid hinge 160a and the second lid hinge 160b enable movement of the first lid slot assembly 115a and the second lid slot assembly 115b respectively to cover the first solid hive box divider 190a and the second solid hive box divider 190b respectively.

The beehive system 100 further comprises the plurality of first type of beehive frames 165a-165c and the plurality of second type of beehive frames 170a, 170b as shown in FIG. 3.

The plurality of first type of beehive frames 165a-165c comprises a first beehive frame 165a, a second beehive frame 165b and a third beehive frame 165c. The first beehive frame 165a is positioned at the top portion of the first brood box 105a, wherein a width and a length of the first brood box 105a comprise perpendicular sides adapted to receive the first beehive frame 165a. Similarly, the second beehive frame 165b is positioned at the top portion of the second brood box 105b, wherein a width and a length of the second brood box 105b comprise perpendicular sides adapted to receive the second beehive frame 165b and the third beehive frame 165c is positioned at the top portion of the common brood box 105c, where a width and a length of the common brood box 105c comprise perpendicular sides adapted to receive the third beehive frame 165c. The plurality of first type of beehive frames 165a-165c is installed/arranged in the first brood box 105a, the second brood box 105b and the common brood box 105c, respectively, such that a gap 195 exists between each individual block/sub-frame of each of the plurality of first type of beehive frames 165a-165c as shown in FIG. 9. The gap 195 is typically approximately ⅜" between beehive frames, which allows the bees in the beehive system 100 to maneuver around the beehive frames 165a-165c. Further, each of the plurality of first type of beehive frames 165a-165c has a same length and a same width and a distance between one beehive frame to another beehive frame in the plurality of first type of beehive frames 165a-165c is based on user requirements or based on industry standards. Further, a height of the plurality of first type of beehive frames 165a-165c may be 9⅛".

The plurality of second type of beehive frames 170a, 170b comprises a fourth beehive frame 170a and a fifth beehive frame 170b. The fourth beehive frame 170a is arranged at a top portion of the first solid hive box divider 190a and the fifth beehive frame 170b is arranged at a top portion of the second solid hive box divider 190b. Each of the plurality of second type of beehive frames 170a, 170b has a same length and a same width and a distance between one beehive frame to another beehive frame in the plurality of second type of beehive frames 170a, 170b is based on user requirements or based on industry standards. Further, a height of the plurality of second type of beehive frames 170a, 170b may be 6 and ¼". The plurality of second type of beehive frames 170a, 170b is installed/arranged in such a way that the gap 195 between each individual block/sub-frame of each of the plurality of second type of beehive frames 170a, 170b is typically approximately ⅜" between beehive frames, which allows the bees in the beehive system 100 to maneuver around the beehive frames 170a, 170b.

Two different heights of the plurality of first type of beehive frames 165a-165c and the plurality of second type of beehive frames 170a, 170b with foundation can be utilized to provide for a consistent ⅜" spacing between the plurality of first type of beehive frames 165a-165c and the plurality of second type of beehive frames 170a, 170b while allowing adequate separation between the first brood box 105a and the second brood box 105b to accommodate the first brood box 105a and the second brood box 105b with the first telescoping cover with inner cover 130a and the second telescoping cover with inner cover 130b, respectively.

In an embodiment of the present invention, the plurality of first type of beehive frames 165a-165c is different from the plurality of second type of beehive frames 170a, 170b. In another embodiment of the present invention, the plurality of first type of beehive frames 165a-165c is substantially similar to the plurality of second type of beehive frames 170a, 170b.

The beehive system 100 further comprises the plurality of recesses 175a-175b, the first set of frame rest 180a, the second set of frame rest 180b, and the gasket 197. The plurality of recesses 175a-175b supports the plurality of second type of beehive frames 170a, 170b. The first set of frame rest 180a is positioned/installed on opposite walls in the first brood box 105a and the second set of frame rest 180b is positioned/installed on opposite walls in the second brood box 105b and provide durability to the first beehive frame 165a and the second beehive frame 165b respectively. Each of the first set of frame rest 180a and the second set of frame rest 180b are made of a metal or any suitable material. The gasket 197 provides sealing and insulation in the beehive system 100. The gasket 197 is installed below the first lid slot assembly 115a and the second lid slot assembly 115b (i.e., below lids), which hinges open to allow for installation of the first solid hive box divider 190a and the second solid hive box divider 190b. The gasket 197 helps protect against rain (moisture) getting into the beehive system 100.

Figure 11:
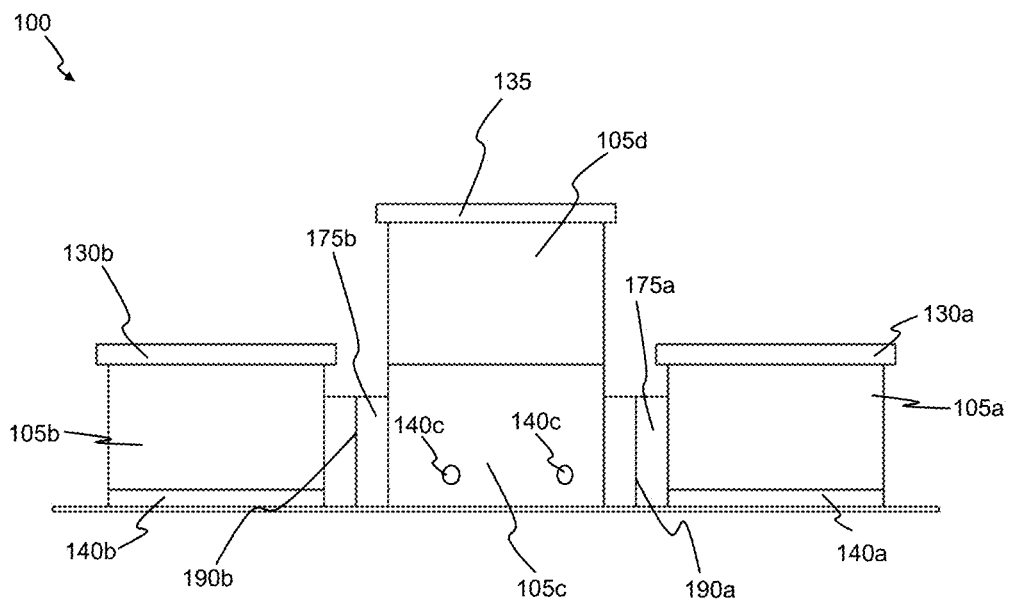
FIG. 11 illustrates a schematic configuration of a high production honey beehive system during a dormant phase.

FIG. 11 illustrates a schematic configuration of a high production honey beehive system during a dormant phase. The first solid hive box divider 190a and the second solid hive box divider 190b are removably placed in the beehive system using the first panel receiving slot 199a and the second panel receiving slot 199b respectively, thereby separating common brood box 105c and the third brood box 105d from both the adjacent first brood box 105a and the adjacent second brood box 105b. During the Dormant Phase, the first brood box 105a and the second brood box 105b are both empty and void of the plurality of beehive frames 165a and 165b respectively. For a previously established beehive, the Dormant Phase chronologically follows the Hive Population Decrease Phase. When following the Hive Population Decrease Phase, the first honey super box 110a, the plurality of first type of beehive frames 165c in the first honey super box 110a, the second queen excluder (horizontal queen excluder) 155b, and the first queen excluder 155a are removed. Further, any bees remaining on the plurality of first type of beehive frames in the first honey super 110a and on the plurality of first type of beehive frames 165c are shaken from these frames into the first brood box 105a and/or the second brood box 105b. The plurality of first type of beehive frames 165a is removed from the first brood box 105a and placed in the common brood box 105c. The third brood box 105d is then installed, positioned over and in vertical alignment with the common brood box 105c. The plurality of first type of beehive frames 165b is removed from the second brood box 105b and placed in the third brood box 105d. The third brood box 105d is covered by the third telescoping cover with inner cover 135.

This is the first high production beehive system configuration to use when starting a new beehive. During this phase, the high production honey beehive system consists of one queen bee and one bee colony contained within the common brood box 105c and the third brood box 105d each containing the plurality of first type of beehive frames 165c and 165d respectively, wherein a front side of the common brood box 105c, and a front side of the third brood box 105d are located in a same plane, a first telescoping cover with inner cover 130a for covering the first brood box 105a, a second telescoping cover with inner cover 130b for covering the second brood box 105b, and a third telescoping cover with inner cover 135 for covering the third brood box 105d.

Figure 12:
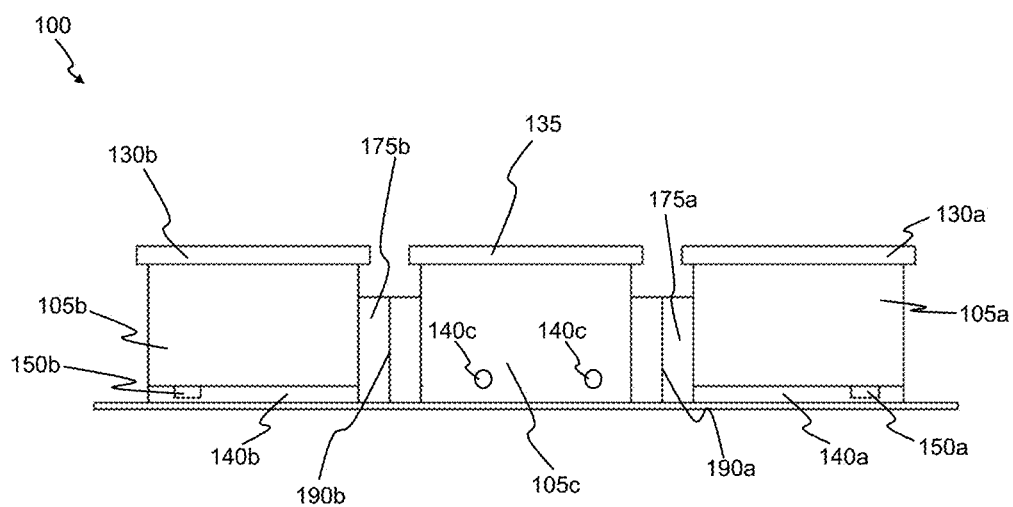
FIG. 12 illustrates a schematic configuration of the high production honey beehive system during a hive splitting phase.

FIG. 12 illustrates a schematic configuration of the high production honey beehive system during a hive splitting phase. The hive splitting phase chronologically follows the dormant phase. During the hive splitting phase, a plurality of first type of beehive frames 165c and 165d are transferred from the common brood box 105c and the third brood box 105d to the first brood box 105a and the second brood box 105b respectively. The third brood box 105d is removed from the high production beehive system and the third telescoping cover with inner cover 135 is placed on top of the common brood box 105c. Approximately 24 hours after the transfer of beehive frames with bees occurs, one new queen bee is added to the queenless brood box, either the first brood box 105a or the second brood box 105b.

Figure 13:
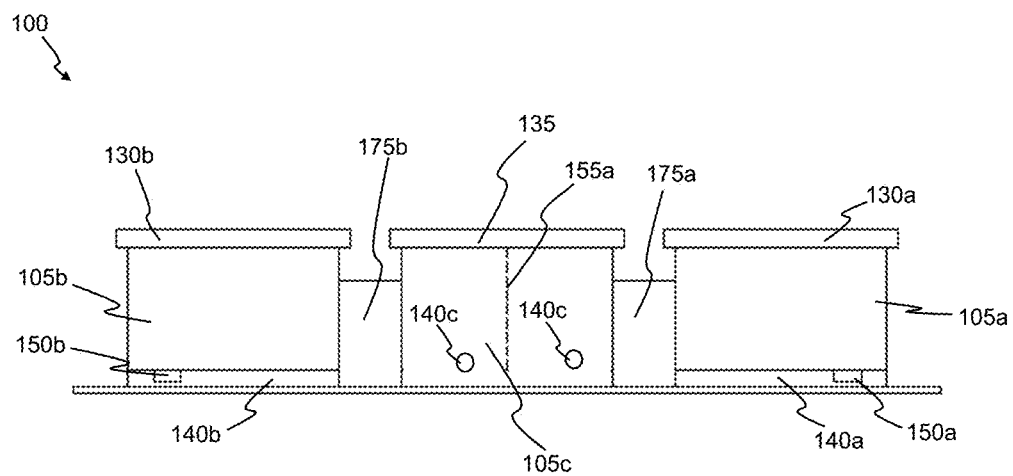
FIG. 13 illustrates a schematic configuration of the high production honey beehive system during a hive population increase phase.

FIG. 13 illustrates a schematic configuration of the high production honey beehive system during a hive population increase phase. The hive population increase phase chronologically follows the hive splitting phase. During the hive population increase phase, the first queen excluder (i.e., vertical queen excluder) 155a is removably placed in the common brood box 105c using the first panel receiving slot 199c. The plurality of first type of beehive frames is placed at the common brood box 105c on both sides of the first queen excluder (vertical queen excluder) 155a. The plurality of second type of beehive frames 170a and 170b is placed in the plurality of recesses 175a and 175b respectively. The first solid hive box divider 190a and the second solid hive box divider 190b are removed from the first panel receiving slot 199a and the second panel receiving slot 199b respectively, thereby allowing the queen bee in the first brood box 105a to occupy the plurality of recesses 175a and the portion the common brood box 105c located to the first brood box 105a side of the first queen excluder (i.e., vertical queen excluder) 155a and the queen bee in the second brood box 105c to occupy the plurality of recesses 175b and the portion the common brood box 105c located to the second brood box 105b side of the first queen excluder (vertical queen excluder) 155a. The worker bee populations in the first brood box 105a and the second brood box 105b are able to occupy any portion of the first brood box 105a, the second brood box 105b, the common brood box 105c, the plurality of recesses 175a or the plurality of recesses 175b.

Figure 14:
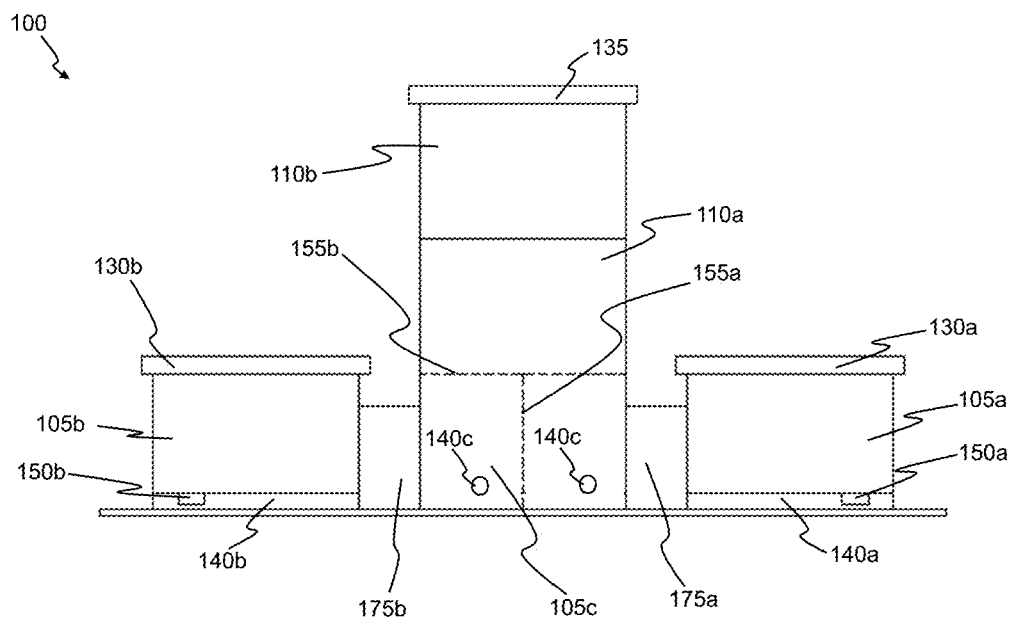
FIG. 14 illustrates a schematic configuration of a high production honey beehive system during a hive population peak phase.

FIG. 14 illustrates a schematic configuration of a high production honey beehive system during a hive population peak phase. The hive population peak phase chronologically follows the hive population increase phase. The second queen excluder (i.e., horizontal queen excluder) 155b in placed on top of the common brood box 105c such that the edges of the second queen excluder (horizontal queen excluder) 155b align with the exterior vertical surfaces of the common brood box 105c. The first honey super box 110a is positioned over and in vertical alignment with the common brood box 105c. The plurality of first type of beehive frames 165a is placed the first honey super box 110a. After approximately 80% of the first type of beehive frames 165a in the first honey super box 110a have been filled with honey, the second honey super box 110b with the plurality of first type of beehive frames 165b positioned over and in vertical alignment with the first honey super box 110a is added. Additional honey super boxes with the plurality of first type of beehive frames may be added as necessary depending on the amount of honey that the beehive is producing. The upper most honey super box is covered by the third telescoping cover with inner cover 135.

Figure 15:
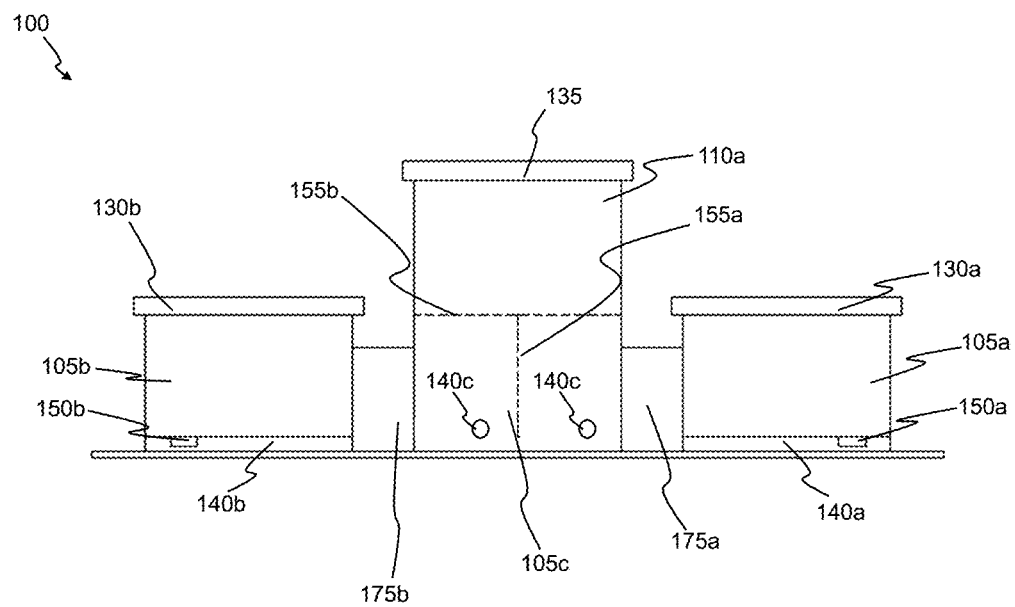
FIG. 15 illustrates a schematic configuration of a high production honey beehive during a hive population decrease phase.

FIG. 15 illustrates a schematic configuration of a high production honey beehive during a hive population decrease phase. The hive population decrease phase chronologically follows the Hive Population Peak Phase. When the beehive has stopped producing honey, all honey super boxes that were installed above the first honey super box 110a may be removed from the beehive. The plurality of beehive frames located within the removed honey super boxes may then be processed to extract the honey stored in these beehive frames. The first honey super box 110a is covered by the third telescoping cover with inner cover 135.

It may be noted that although the present invention shows various elements of the beehive system 100, but it is to be understood that other alternatives are not limited thereon. For example, though not shown, the invention could be modified to accommodate queen excluders that insert via other openings between the brood boxes 105a, 105b and the honey super box 110a. Further, the labels or names of the elements/components are used only for illustrative purpose and do not limit the scope of the present invention. The shape and size of the various elements in the beehive system 100 do not limit the scope of the present invention.

Unless otherwise defined, all technical and scientific terms used herein have the same meaning as commonly understood by one of ordinary skill in the art to which this invention belongs. Although systems, methods and materials similar to or equivalent to those described herein can be used in the practice or testing of equivalent systems and methods, suitable systems and methods and are described above.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. A beehive system, comprising:
a first brood box;
a second brood box;
a common brood box between the first brood box and the second brood box, the common brood box having a queen excluder receiving slot adapted to vertically receive a first queen excluder therein;
a first lid slot assembly between the common brood box and the first brood box; and
a second lid slot assembly between the common brood box and the second brood box;
wherein the common brood box, the first brood box and the second brood box are arranged parallel to each other,
wherein a bottom side of the first brood box, a bottom side of the second brood box and a bottom side of the common brood box are located in a same plane,
wherein the first lid slot assembly and the second lid slot assembly are arranged above a ground plane and comprise a first lid latch assembly and a second lid latch assembly respectively, and
wherein each of the first lid latch assembly and the second lid latch assembly comprises a first connecting means and a second connecting means for latching the first lid slot assembly and the second lid slot assembly respectively.

2. The beehive system of claim 1 further comprising a first queen excluder in the first queen excluder slot.

3. The beehive system of claim 2, further comprising a second queen excluder separating the common brood box from a super honey box and being disposed there-between.

4. The beehive system of claim 1 further comprising:
a first telescoping cover with inner cover for covering the first brood box;
a second telescoping cover with inner cover for covering the second brood box; and
a third telescoping cover with inner cover for covering the common brood box.

5. The beehive system of claim 1 further comprising:
a first entrance reducer placed at an entrance to the first brood box so as to reduce a size of an opening of the first brood box;
a second entrance reducer placed at an entrance to the second brood box so as to reduce a size of an opening of the second brood box;
a bee entrance in the common brood;
a first bottom board placed under the first brood box, wherein the first entrance reducer is placed between the first bottom board and the first brood box, wherein a length of the first bottom board is greater than a length of the first brood box;
a second bottom board placed under the second brood box, wherein a length of the second bottom board is greater than a length of the second brood box, wherein the second entrance reducer is placed between the second bottom board and the second brood box; and
an integral bottom board at the common brood box that extends from the edge of the first bottom board to the edge of the second bottom board.

6. The beehive system of claim 5 wherein:
the first entrance reducer comprising an opening to provide a passage way for the bees into the first brood box;
the second entrance reducer comprising an opening to provide a passage way for the bees into the second brood box; and
the first bottom board providing a landing space for bees to assemble in front of the first brood box, the second bottom board providing a landing space for the bees to assemble in front of the second brood box, and the integral bottom board at the common brood box that extends from the edge of the first bottom board to the edge of the second bottom board.

7. The beehive system of claim 5 wherein the first bottom board comprises at least one of a screened bottom board and a solid bottom board, and the second bottom board comprises at least one of the screened bottom board and the solid bottom board and the integral bottom board at the common brood box that extends from the edge of the first bottom board to the edge of the second bottom board.

8. The beehive system of claim 1 further comprising:
a first honey super box positioned over and in vertical alignment with the common brood box;
a second honey super box positioned over and in vertical alignment with the first honey super box;
a first telescoping cover with inner cover for covering the first brood box;
a second telescoping cover with inner cover for covering the second brood box; and
a third telescoping cover with inner cover for covering the second honey super box.

9. The beehive system of claim 1 further comprising:
a first queen excluder dividing the common brood box in two, so as to provide beehive frames to be added to both the first brood box and the second brood box, wherein the first queen excluder separates a queen bee in the first brood box from the second brood box;
a first panel receiving slot incorporated to receive the first queen excluder;
a second queen excluder separating the common brood box from the first honey super box, wherein the second queen excluder keeps the queen bee separate from the first honey super box;
a first lid hinge and a second lid hinge enabling movement of the first lid slot assembly and the second lid slot assembly respectively to cover a first solid hive box divider and a second solid hive box divider respectively;
a plurality of first type of beehive frames, wherein a first beehive frame is positioned at a top portion of the first brood box, a second beehive frame is positioned at a top portion of the second brood box, and a third beehive frame is positioned at a top portion of the common brood box, wherein each of the plurality of first type of beehive frames has a same length and a same width; and
a plurality of second type of beehive frames, wherein a fourth beehive frame is arranged at a top portion of the first solid hive box divider and a fifth beehive frame is arranged at a top portion of the solid hive box divider, wherein each of the plurality of second type of beehive frames has a same length and a same width.

10. The beehive system of claim 9 wherein the plurality of first type of beehive frames is different from the plurality of second type of beehive frames.

11. The beehive system of claim 9 wherein the plurality of first type of beehive frames is substantially similar to the plurality of second type of beehive frames.

12. The beehive system of claim 9 wherein:
a width and a length of the first brood box comprise perpendicular sides adapted to receive the first beehive frame;
a width and a length of the second brood box comprise perpendicular sides adapted to receive the second beehive frame; and
a width and a length of the common brood box comprise perpendicular sides adapted to receive the third beehive frame.

13. The beehive system of claim 9 wherein:
a plurality of recesses for supporting the plurality of second type of beehive frames; and
a first set of frame rest and a second set of frame rest for resting and providing durability to the first beehive frame and the second beehive frame respectively.

14. The beehive system of claim 1 further comprising:
a first solid hive box divider and a second solid hive box divider removably placed in the beehive system using a first panel receiving slot and a second panel receiving slot respectively, so as to separate the common brood box and a third brood box from the first brood box and the second brood box;
a plurality of first type of beehive frames removed from the first brood box and placed in the common brood box;
the third brood box positioned over and in vertical alignment with the common brood box; and
the plurality of first type of beehive frames removed from the second brood box and placed in the third brood box, wherein the third brood box is covered by a third telescoping cover with inner cover.

15. The beehive system of claim 14, further comprising:
the third telescoping cover with inner cover transferred from the common brood box and the third brood box to the first brood box and the second brood box respectively, wherein the third brood box is removed from the beehive system and the third telescoping cover with inner cover is placed on top of the common brood box.

16. The beehive system of claim 9 further comprising:
the first queen excluder removably placed in the common brood box using the first panel receiving slot;
the plurality of first type of beehive frames placed at the common brood box on sides of the first queen excluder;
the plurality of second type of beehive frames placed in a plurality of recesses respectively;
the first solid hive box divider and the second solid hive box divider removed from the first panel receiving slot and a second panel receiving slot respectively, so as to allow the queen bee in the first brood box to occupy the plurality of recesses; and
a portion of the common brood box located to a side of the first brood box of the first queen excluder and the queen bee in the second brood box to occupy the plurality of recesses and the portion of the common brood box located to a side of the second brood box of the first queen excluder.

17. The beehive system of claim 1 wherein:
a first solid hive box divider for separating the first brood box from the common brood box, wherein a first panel receiving slot is incorporated to receive the first solid hive box divider; and
a second solid hive box divider for separating the second brood box from the common brood box, wherein a second panel receiving slot is incorporated to receive the second solid hive box divider.

18. The beehive system of claim 17 wherein:
a first queen excluder is removably placed in the common brood box; and
a second queen excluder is removably placed on top of the common brood box and below the first honey super box.

19. The beehive system of claim 1 further comprising a gasket to provide sealing and insulation in the beehive system.

20. The beehive system of claim 1 wherein:
the first brood box, the second brood box and the common brood box house a plurality of eggs, larvae and pupae from bees;
the beehive system is made of at least one of wood, steel, polymer, plastic, aluminum or combination thereof; and
the common brood box, the first brood box and the second brood box share a common front panel.

* * * * *